Sept. 10, 1935.    R. KLAR    2,014,137
PHOTOGRAPHIC CAMERA
Filed Feb. 7, 1934
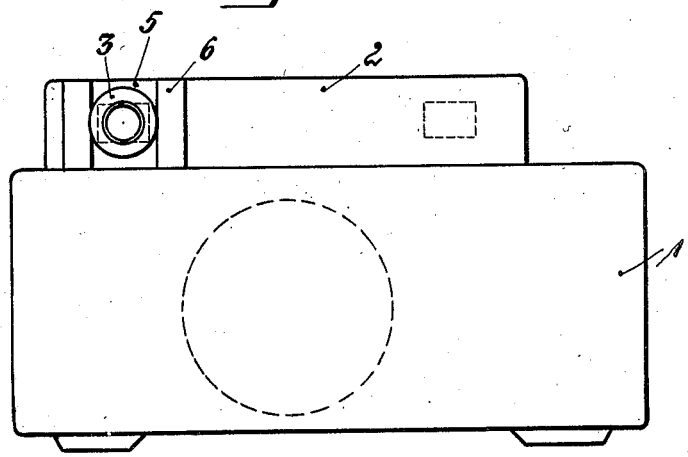
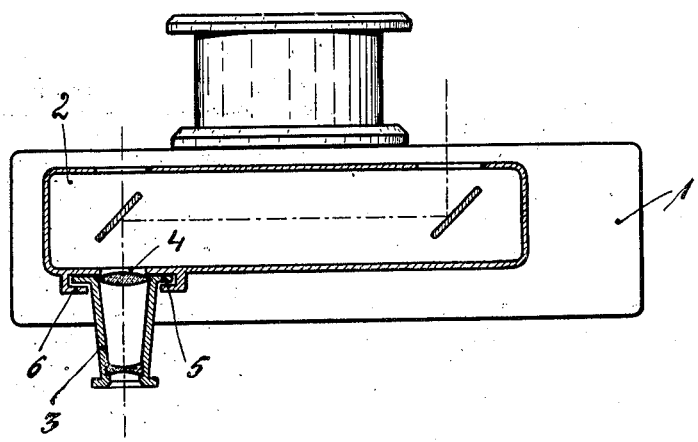
Inventor:
Reinhold Klar.
by: Hans Hedrich
Attorney.

Patented Sept. 10, 1935

2,014,137

UNITED STATES PATENT OFFICE 2,014,137

PHOTOGRAPHIC CAMERA

Reinhold Klar, Dresden-A, Germany, assignor to the firm: Zeiss Ikon Aktiengesellschaft, Dresden, Germany Application February 7, 1934, Serial No. 710,149
In Germany December 1, 1932

2 Claims. (Cl. 88—2.2)

In order to render possible a highly accurate fine-adjustment of the objective of a photographic camera without the necessity to observe a ground glass-plate or an equivalent for the same, photographic cameras have already been rigidly connected with a distance meter, but in order to obviate an unnecessary enlargement of the camera casing and to accommodate the distance meter to the dimensions of the camera, there then arises the necessity to make the length of the basis comparatively short. However, with a short basis of the distance meter the accurateness of the adjustment is comparatively slight.

A way to increase the measuring exactness of the distance meter is this, to magnify the pictures produced with the aid of the distance meter and to arrange for this purpose a telescope in front of the peep aperture of the distance meter. A twofold optic magnification yields, for instance, the same increase of the measuring accuracy as the doubling of the basis of the distance meter.

Any desired telescope may be employed for the purpose in view, but preferably a Galilean-telescope will be used because of its simple construction.

The telescope may be arranged in front of the peep aperture of the distance meter also in such a manner that it can be detached from the same and exchanged for another one. It is in such a case possible to adjust the telescope in such a manner, for instance by shoving the telescope lenses towards one another, that defects of the eyes of the user of the camera, as for instance short-sightedness or long-sightedness, are compensated.

When making use of a distance meter which is rigidly connected with the camera and provided with a telescope, as just described, it is immaterial whether the movable part of the distance meter is to be moved from the objective or its mounting or whether a separate adjusting member for the distance meter is provided.

The invention is illustrated diagrammatically and by way of example on the accompanying drawing on which Figure 1 is a rear view of a combined photographic camera and distance meter designed according to this invention, and Figure 2 is a plan of the same, partly in horizontal section. On the drawing, 1 denotes the camera casing and 2 the distance meter which is rigidly connected with said casing. 2 is the peep aperture of the camera, and 3 a Galilean-telescope attached to the distance meter in front of said aperture. More precisely, the telescope is attached to a slide 5 which is shiftable between guides 6 affixed to the distance meter. Means (not shown) are provided for the fine-adjustment of the said telescope.

I claim:

1. In combination a photographic camera casing, a basis distance meter attached thereto, a telescope and means adapted for attaching said telescope in front of the peep aperture of said distance meter.

2. In combination, a photographic camera casing, a basis distance meter attached thereto, lateral guides arranged in front of the peep aperture of said distance meter, a slide adapted to engage said guides, and a telescope attached to the said slide.

REINHOLD KLAR.